United States Patent
Askew et al.

[15] 3,698,479
[45] Oct. 17, 1972

[54] SOLUBILIZED OIL-WATER SOLUTIONS SUITABLE FOR MISCIBLE FLOODING

[72] Inventors: Warren S. Askew; Richard E. Marrs, both of Tulsa, Okla.

[73] Assignee: Amoco Production Company

[22] Filed: Aug. 8, 1969

[21] Appl. No.: 848,500

[52] U.S. Cl. ............... 166/273, 166/274, 252/308, 252/309, 252/49.5, 252/312
[51] Int. Cl. .............................. E21b 43/16
[58] Field of Search.....252/309, 312, 308, 311, 49.5; 166/273, 274, 275

[56] References Cited

UNITED STATES PATENTS

| | | | |
|---|---|---|---|
| 3,506,070 | 4/1970 | Jones | 166/273 |
| 2,289,536 | 7/1942 | Bradley | 252/312 |
| 2,356,254 | 8/1944 | Lehmann, Jr. | 252/170 |
| 2,355,591 | 8/1944 | Flaxman | 252/170 X |
| 2,770,598 | 11/1956 | Jezl | 252/33.3 |
| 3,497,006 | 2/1970 | Jones et al. | 166/273 |
| 2,806,001 | 9/1957 | Fong et al. | 252/DIG. 1 |
| 3,117,929 | 1/1964 | McCoy et al. | 252/312 |

*Primary Examiner*—John D. Welsh
*Attorney*—Paul F. Hawley and Arthur McIlroy

[57] ABSTRACT

Solubilized oil-water solutions suitable for use in miscible flooding and injection well clean-out methods are prepared from an alkali metal petroleum sulfonate containing free mineral oil and/or crude oil, a cosurfactant or coupling agent such as the ethylene oxide adducts of 4 to 10 carbon atom primary alcohols and a mono-valent ion brine solution having a solids concentration not greater than about 60,000 parts per million. Such solubilized oil-water systems when introduced in the form of a slug into an oil bearing reservoir and displaced through the latter tend to dissolve oil into and reject water from the leading edge of the slug thus creating a gradation of viscosity which increases from the leading edge to the trailing edge of the slug thereby aiding in preventing bypassing of the driving water around the slug during flooding operations. The ratio of sulfonate to cosurfactant employed in these compositions ranges from 1:9 to 7:3.

9 Claims, 1 Drawing Figure

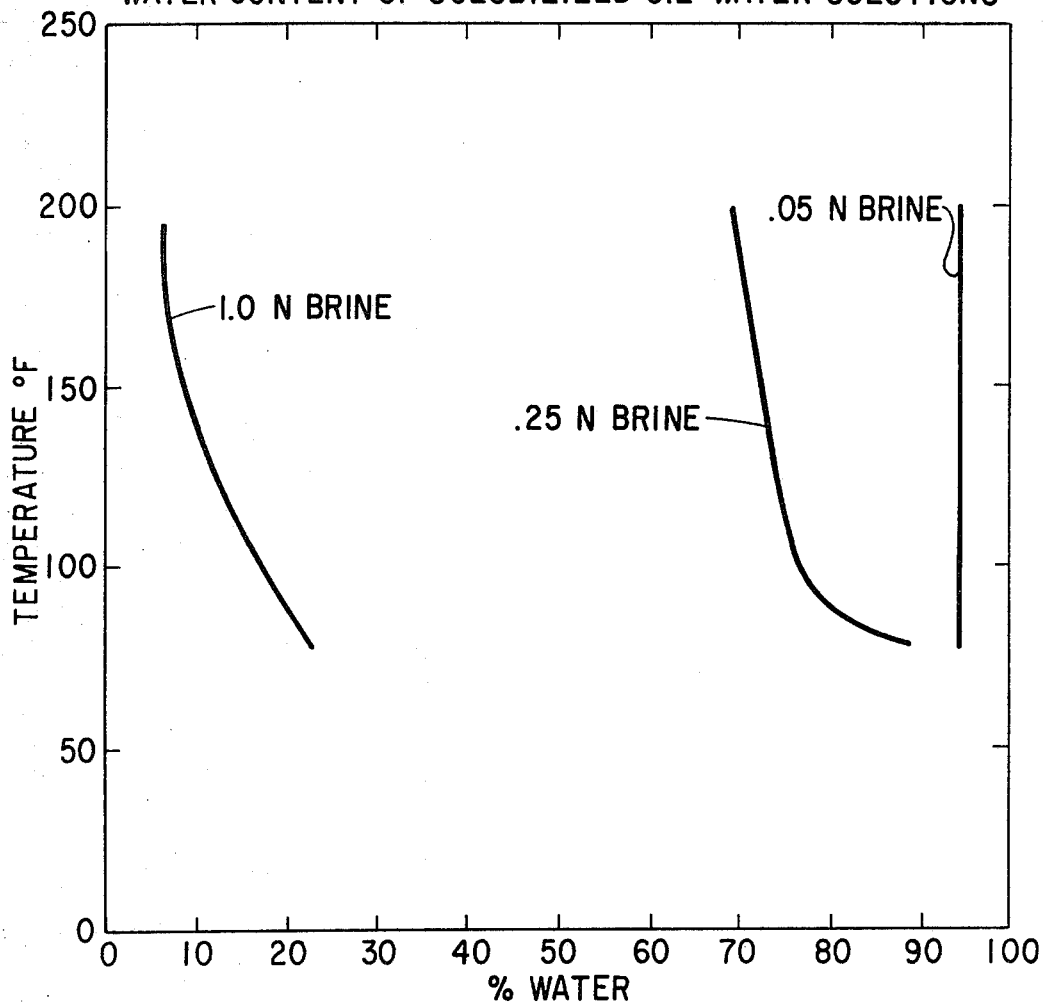

SOLUBILIZED OIL-WATER SOLUTIONS SUITABLE FOR MISCIBLE FLOODING

The present invention relates to new and useful compositions of matter. More particularly, it is concerned with solubilized oil-water or micellar solutions produced from a petroleum sulfonate, a cosurfactant or coupling agent and brine. We have found that such solutions can remain essentially homogeneous and stable even at high concentrations water, e.g., about 90 percent by weight. These solutions may be employed in oil recovery operations such as miscible flooding, or as a solvent in injection well cleanout procedures.

BACKGROUND OF THE INVENTION

It has been previously pointed out that solubilized oil-water systems can be employed as a type of solvent slug in miscible flooding operations to recover oil from an underground reservoir. In such a procedure the leading edge of the slug is miscible with the oil bank ahead of it and the water or aqueous component used in the drive system is miscible, or at least soluble to a high degree, in the trailing edge of the solvent slug, in effect, to form a single phase flooding operation.

Compositions of the general type described and claimed in this application have been previously taught in Jones U. S. Pat. No. 3,308,068 and Gogarty U. S. Pat. No. 3,406,754 and U. S. Pat. No. 3,412,791 to be useful in miscible flooding. In the former patent the micellar or oil solubilized water solutions described therein are of the type to which an infinite amount of fresh water can be added without the occurrence of a susceptible phase separation. With systems of this kind it will be apparent that their use in oil recovery operations is limited, however, because the oil solvent power of the micellar solution decreases as it passes through the reservoir owing to its tendency to take up water. Micellar solutions of the class described in U. S. Pat. No. 3,406,754 and U. S. Pat. No. 3,412,791 initially contain from about 20 –40 weight percent water. Solvent slugs of this kind as they pass through the reservoir likewise tend to take up more water. This gives rise to undesirable complications. For example, such micellar systems when introduced into the reservoir have an oil external phase. However, when the water content of these solutions exceeds about 40 weight percent they invert to water-external micellar solutions having little solvent power for oil. This inversion causes a sharp increase in viscosity and can result in emulsion formation or poor mobility control; thus rendering the solution essentially ineffective for use as miscible flooding solvent.

DESCRIPTION OF THE INVENTION

The solubilized oil-water solutions of our invention comprise essentially an alkali metal or ammonium petroleum sulfonate, a hydrocarbon oil, a coupling agent or cosurfactant material and brine, substantially free of divalent metal ions. These solutions are prepared by contacting a suitable mixture of petroleum sulfonate, mineral oil and a coupling agent with a brine solution, e.g., 0.25 N sodium chloride. The resulting mixture is agitated and shaken vigorously and the oil component allowed to separate as an upper layer. The latter is a clear solubilized solution, with the sulfonate, coupling agent, oil and brine as components. Contrary to Jones U.S. Pat. No. 3,308,068 an infinite amount of water cannot be added to the solutions of our invention with out a phase change. Concentrations of brine in the solubilized solution thus formed have been found to range from about 3 to about 90 percent by weight, such compositions still retaining the characteristics of an oil solution. These solutions exhibit extremely good properties for use in miscible flooding operations. They are completely miscible with oil, i.e., oil goes into the solution in all proportions, while the presence of the sulfonate tends to reduce the interfacial tension between the solution and brine down to a value of about 0.01 dyne per cm., thus creating a high degree of water solubility in the trailing edge of the solution slug being driven through the reservoir by means of an aqueous drive system. This phenomenon holds bypassing or trapping of the slug to a minimum and for all practical purposes produces essentially the same effect as is obtained through single phase miscible flooding.

Another property of these solutions which gives them advantages in miscible flooding is their tendency to dissolve or absorb oil and drip out water from the system. By this action the solution increases its oil concentration with less than a 1 percent loss of surfactant due to any brine that has dropped out of solution. The solubilized solutions of our invention can be prepared with good viscosity characteristics that make possible highly favorable mobility control conditions in miscible flooding operations. In a flooding operation, as oil is taken up into and brine is rejected from the solubilized solution, the viscosity of the solution decreases and approaches that of the oil in place. The leading edge of the micellar slug is diluted with oil before the latter contacts the trailing edge of the slug. Accordingly, the front of the slug has a lower viscosity than that of its trailing edge, and the viscosity of the slug increases from its leading edge to its trailing edge. This circumstance insures an extremely favorable mobility control for the slug during the miscible flood. In our work we have found, for example, that when the slug of solubilized solution has traveled through an oil bearing formation for a distance, the graduation in viscosity from the leading edge to the trailing edge of the slug may range from about 1.8 cps. at the front to 16.75 cps. at the back of the slug. This provides a near ideal circumstance for a direct drive miscible flooding operation since one of the desirable conditions in such a procedure is to have the viscosity of the driving fluid greater than that of the driven fluid. Also, it should be pointed out that in this particular solution its composition varied from 3.5 weight percent brine, 75.5 weight percent oil, and 21 weight percent petroleum sulfonate plus cosurfactant at the leading edge of the micellar slug to 77 weight percent brine, 17 weight percent oil, and 6 weight percent sulfonate and cosurfactant at the trailing edge. Because of the tendency of the compositions of our invention to dissolve oil and reject water during flow through an oil bearing reservoir, the size and composition of the solubilized solution employed should be designed in such a way so that by the time it reaches the production well substantially all of the water originally present in it has dropped out. The specific composition and size of such slug will, of course, depend to some extend on the nature of the oil bearing formation and the distance between the injection and producing wells involved.

When employing the solubilized oil-water solutions of our invention in a miscible flooding operation one factor that should be taken into consideration is the reservoir temperature. We have found, in general, the amount of water that will in the solubilized solution at a given temperature depends on the strength of the brine used in preparing such solution. The behavior of these solutions with respect to brine concentration and temperature is shown by the plots in the accompanying drawing. The particular sulfonate, hydrocarbon content and cosurfactant used in obtaining the data forming the basis of these plots were identical in composition, as used in Example II below. From the curves presented it can be seen that as the brine concentration increases the stability of the solubilized oil-water solution decreases at a given temperature except when we are considering dilute brines, e.g., 0.05 N, then temperature has little or no effect on the amount of water retained in the solution. It is also shown — again with the exception of dilute brines — that for a given brine concentration the amount of water that can be held in the solution depends upon the temperature. Owing to the ability of the solutions of our invention to tolerate relatively large mounts of water (brine), they possess a very distinct and practical advantage over related compositions of the prior art. Thus, although previous systems hold not more than about 40% water, by the present invention we are able to provide an oil solvent that can contain from about 70 to about 90 percent water thereby reducing very substantially the cost of chemicals used in a miscible flooding operation.

In forcing the solution through a reservoir as contemplated by our invention the problem of mobility control can be an important factor owing to the difference in viscosity between the solubilized solution and the water used as the drive agent. To avoid fingering or bypassing of the driving water thickened water having a mobility no greater than that of the solubilized solution is introduced into the system immediately following the solubilized slug.

Still another embodiment of the process of our inventions concerns the use of these solubilized solutions in injection well cleanout procedures. In cases of this kind the size and content of the slug are not as important as when such solutions are used in driving to a producing well. The main objective in a injection well cleanout process is, of course, to reduce oil saturation and to dissolve the heavier oil and tar-like substance present in the vicinity of the well bore. Once such films and deposits are dissolved and the resulting solution carried out into the formation by a subsequent water driving step, the injectivity of the treated well will be observed to increase many fold. The procedure may be carried out with or without the use of an extraneous mobility control agent.

In carrying out a miscible flooding operation as contemplated by our invention the slug size may vary rather widely, however, for the majority of cases it may correspond from about 0.02 to about 0.15 pore volume. Slug sizes less than 0.02 pore volume or a few barrels per foot of pay may be used in the injection well cleanout method referred to above.

The sulfonates employed in preparation of the novel compositions of our invention are produced by the treatment of lube stock or similar mineral oils, first with sulfuric acid and then neutralizing with caustic. Such sulfonates are frequently referred to as petroleum mahogany sulfonates, the cationic portion of which may be any of the alkali metals. The corresponding divalent metal ion salts or the presence of excessive amounts of divalent metal ions in the system in which these solubilized solutions are used is undesirable. Likewise, the petroleum alkali metal sulfonates, when in a formation brine containing divalent metal ions, tend to create emulsion problems. The average molecular weight of these sulfonates ranges from about 400 to 600. They are predominantly oil-soluble and their solubility in water should not exceed about five weight percent. Typically, a commercial sulfonate composition useful in preparing the solutions of our invention has an average molecular weight of from about 450 to about 500, contains about 58 –60 percent sodium petroleum sulfonate, 30 –40 mineral oil, and 2 –3 percent inorganic salt, all percentages being by weight.

The brines used in making these micellar solutions may vary in strength from about 3,000 ppm up to about 1 N strength NaCl or about 60,000 ppm. As previously pointed out, a minimum of divalent metal ions should be present in order to avoid emulsion formation. The minimum strength brine employed may be defined as one which yields a micellar or solubilized oil-water solution, when mixed with the sulfonate and cosurfactant, that will absorb oil and reject water at the reservoir temperature. The solution is typically designed to be saturated with the desired strength brine at the reservoir temperature. In most instances the practical minimum brine concentration is about 5,000 ppm and the maximum is about 58,000 ppm, in the case of sodium chloride. Within the recited concentration limits larger volumes of brine are taken up at the lower concentrations. For example, a typical micellar solution made with a 0.25 N brine can solubilize about 90 weight percent of water, whereas a 1 N brine can solubilize only about 20 weight percent water.

Mobility control agents suitable for use in combination with the compositions of our invention with brine using the latter in waterflood operations includes certain polysaccharides as described in U. S. Pat. No. 3,373,810 and partially hydrolyzed polyacrylamides of the type disclosed in U. S. Pat. No. 3,039,529 Aqueous solutions of these materials containing from about 0.05 to about 5 weight percent of the polysaccharide or of the partially hydrolyzed polyacrylamide can be used, in volumes ranging from about 0.15 to about 0.65 pore volume.

The utility of the compositions of our invention in miscible flooding is illustrated by reference to the following specific examples.

EXAMPLE I

A sand pack 52 inches long and 1½ inches in diameter was prepared from No. 16 Ottawa sand. The pack was initially saturated with 0.25 N sodium chloride brine and was reduced to connate water saturation (0.192 pore volume) with deobase (a $C_{10}$ to $C_{12}$ hydrocarbon fraction). Injection of a solubilized solution after such treatment thus constituted a secondary recovery miscible flood in a water-wet system. A 0.25 pore volume slug of solution was then injected into the pack at a rate of 0.489 ml./min. The sulfonate portion or oily phase used to prepare the micellar solution, had the following composition: 28.2 percent sodium petroleum mahogany sulfonate (Amoco Mahogany Soap B, 477 mol. wt.), 43.7 percent diethylene glycol-mono-n-hexyl ether, 20.2 percent mineral oil, 3.7 percent deobase, 3.3 percent water, all percentages being by weight. This mixture was then thoroughly agitated with 0.25 N sodium chloride solution to form a solubilized solution containing 76.9 weight percent water. Following injection of the slug, 0.50 pore volume of a mobility buffer solution was injected into the sand pack. This solution contained 0.5 weight percent of a partially hydrolyzed polyacrylamide in 0.25 N sodium chloride brine and possessed a viscosity of 26.7 cp. Thereafter, a 0.25 N sodium chloride brine was injected into the sand pack following the mobility buffer at an injection rate of 0.489 ml, per minute. The solubilized slug moved through the pack in nearly perfect piston flow, and break-through of the slug at the opposite end of the sand pack occurred after total fluid injection of 0.97 pore volume. Slight fingering occurred at the leading edge of the slug (less than 10 percent of the slug length) but both the leading and trailing edges remained well defined during the traverse. A large percentage (the exact amount not obtained) of polymer buffer was recovered. The overall oil recovery experienced was 99.3 percent.

EXAMPLE II

This run was made in a Berea sandstone core, 12 inches long and 2 inches in diameter. The test was designed as a second water wet miscible flood employing a mobility control buffer. The core was initially saturated with 0.25 sodium chloride brine and was then reduced to connate water (0.399 pore volume) with Midland Farms Ellenburger crude oil. The sulfonate-cosurfactant component, i.e., before formation of the micellar solution, had the following composition: 29.3 percent sodium petroleum mahogany sulfonate (Sonneborn Petronate HL, 440 –470 mol. wt.), 44 percent diethylene glycol-mono-n-hexyl ether, 15.6 percent mineral oil, 8.7 percent Midland Farms Ellenburger crude oil, and 2 percent water, all percentages being by weight. This mixture had a specific gravity at 75° F. of 0.955. To make the solubilized solution, the sulfonate-cosurfactant mixture referred to immediately above was agitated with 0.25 N sodium chloride brine resulting in a micellar slug containing 88.8 weight percent water. The injected solubilized slug of 0.5 pore volume was then followed by 0.95 pore volume of a mobility control buffer solution containing 0.4 weight percent of a partially hydrolyzed polyacrylamide, and having a viscosity of 17.0 cp. A 0.25 N sodium chloride solution chloride brine solution thereafter injected behind the mobility buffer. All solutions were injected at the rate of 0.489 cc per minute.

Water production began after injection of 0.43 pore volume of micellar solution indicating that both oil and connate water were being miscibly displaced. Oil phase production fell to zero at a total injection of 1.90 pore volume, for an overall recovery of 99.9 percent. Throughout the test the slug maintained its integrity while miscibly displacing the in-place crude oil in the sand core.

Under conditions similar or identical to those described in Examples I and II, ethylene oxide adducts, i.e., from 1 to 12 mols, of primary alcohols having from four to 10 carbon atoms, give results comparable to those obtained with diethylene glycol mono-n-hexyl ether when used as a cosurfactant in the compositions of our invention. In general, the preferred cosurfactants for use in the methods described herein are the 2 to 8 mol ethylene oxide adducts of n-hexanol. The ratio of sulfonate to cosurfactant may vary rather widely; however, it should be in the range of from 1:9 to 7:3.

In preparing the solubilized oil-water or micellar solutions of our invention with salt water we have produced a system which — when used in a miscible flooding operation for the recovery of oil — takes up oil and rejects water resulting in a built-in mobility control in the solvent slug through viscosity changes, i.e., an increase in viscosity from the leading edge to the trailing edge of the slug. These solubilized solutions are also quite stable under most conditions of use and exhibit low interfacial tension between the oil solution and water phases, thus materially assisting in preventing undesired trapping of the solvent in the reservoir or bypassing of the driving water around the solvent bank.

As used in the present claims, the term "alkali metal petroleum sulfonate" is intended to include the ammonium petroleum sulfonates as well as the corresponding alkali metal salts. These sulfonates are generally used in an oil solution in which the sulfonate is present in a concentration of about 60 to about 80 weight percent. Accordingly, the term "sulfonate" as used herein is to be interpreted as a hydrocarbon solution of the sulfonate in the above indicated strengths.

We claim:
1. In a process for recovering crude oil from an oil-bearing reservoir penetrated by an injection well and by a producing well, the improvement which comprises introducing into said reservoir via said injection well a distinct slug of an oil-external micellar solution comprised essentially of an alkali metal alkyl aryl sulfonate having an average molecular weight of from about 400 to about 600, from about 20 to about 90 weight percent of an aqueous monovalent brine solution ranging in solids contend from about 3,000 ppm to about 60,000 ppm, said micellar solution being substantially saturated with said brine solution, a cosurfactant consisting of a 1 to 12 mol ethylene oxide adduct of a primary alcohol having from four to 10 carbon atoms, the ratio of cosurfactant to sulfonate ranging from 9:1 to 3:7, the combination of sulfonate and cosurfactant being present in a concentration of from about 7.5 to about 60 weight percent and from about 2.5 to about 20 weight percent of a hydrocarbon oil; displacing said slug of micellar solution and crude oil toward said producing well, said micellar solution having the ability under reservoir conditions to absorb crude oil and drop out water therefrom whereby the viscosity of said slug increases from it leading edge to its trailing edge, and recovering crude oil from said producing well.

2. The process of claim 1 wherein the cosurfactant consists of a 2 to 8 mol ethylene oxide adduct of said primary alcohol.

3. The process of claim 1 wherein the brine employed is a sodium chloride solution.

4. The process of claim 2 wherein the cosurfactant is a 2 mol ethylene oxide adduct of n-hexanol.

5. The process of claim 3 wherein the sodium chloride solution is from about 0.05 N to about 0.25 N.

6. The process of claim 1 wherein the ratio of said sulfonate to cosurfactant is about 2.3.

7. The process of claim 1 wherein the combination of sulfonate and cosurfactant is present in a concentration ranging from about 7.5 to about 17.5 weight percent.

8. The process of claim 1 wherein the sulfonate employed is a sodium alkyl aryl sulfonate.

9. The process of claim 1 wherein the sulfonate employed is a sodium alkyl aryl sulfonate and the cosurfactant is a 2 to 8 mol ethylene oxide adduct of n-hexanol.

* * * * *

PO-1050
(5/69)

UNITED STATES PATENT OFFICE
CERTIFICATE OF CORRECTION

Patent No. 3,698,479               Dated October 17, 1972

Inventor(s) Warren S. Askew and Richard E. Marrs

It is certified that error appears in the above-identified patent and that said Letters Patent are hereby corrected as shown below:

Column 1, line 9, --of-- should be inserted following "concentrations".

Column 2, line 20, "drip" should read --drop--; line 40, "graduation" should be --gradation--; line 66, "extend" should be --extent--.

Column 3, line 5, --remain-- should be inserted following "will"; line 38, a comma should be inserted following "water" (first occurrence); line 42 "inventions" should be --invention--.

Column 4, line 45, a period should be inserted before "Aqueous".

Column 5, line 35, --N-- should be inserted following "0.25"; line 43, "8.7" should be --8.9--; line 54, "solution" should be deleted; line 55, "chloride" should be deleted and --was-- inserted following "solution".

Column 7, Claim 6, line 2, "2.3" should be --2:3--

Column 8, Claim 9, line 1, "Claim 1" should read --Claim 7--.

Signed and sealed this 8th day of May 1973.

(SEAL)
Attest:

EDWARD M. FLETCHER, JR.           ROBERT GOTTSCHALK
Attesting Officer                   Commissioner of Patents